United States Patent [19]

Viswanathan et al.

[11] Patent Number: 4,524,164
[45] Date of Patent: Jun. 18, 1985

[54] THERMOSETTING ADHESIVE RESINS

[75] Inventors: Tito Viswanathan; Thomas Richardson, both of Madison, Wis.

[73] Assignee: Chemical Process Corporation, Brookfield, Wis.

[21] Appl. No.: 592,566

[22] Filed: Mar. 23, 1984

Related U.S. Application Data

[63] Continuation-in-part of Ser. No. 557,739, Dec. 2, 1983.

[51] Int. Cl.$^3$ .............................................. C08L 3/02
[52] U.S. Cl. ........................................ 524/14; 524/47; 524/48; 524/56; 524/58; 156/328; 156/330.9
[58] Field of Search ................. 524/13, 14, 56, 57, 524/58, 47, 48; 525/54.3, 54.31; 527/303, 305; 156/328, 330.9, 335

[56] References Cited

U.S. PATENT DOCUMENTS

| | | | |
|---|---|---|---|
| 1,593,342 | 7/1926 | Meigs | 527/303 |
| 1,801,052 | 4/1931 | Meigs | 536/43 |
| 1,801,053 | 4/1931 | Meigs | 524/58 |
| 2,867,590 | 1/1959 | Coutras et al. | 524/58 |
| 2,967,859 | 1/1961 | Osipow et al. | 536/22 |
| 3,480,573 | 11/1969 | Thompson, Jr. et al. | 524/58 |
| 3,865,616 | 2/1975 | Åkerblom | 524/58 |
| 4,085,076 | 4/1978 | Gibbons et al. | 524/13 |
| 4,172,057 | 10/1979 | Henbest | 524/58 |

*Primary Examiner*—John Kight
*Assistant Examiner*—Nathan M. Nutter
*Attorney, Agent, or Firm*—Quarles & Brady

[57] ABSTRACT

A thermosetting adhesive resin suitable for binding lignocellulosic materials to form products, such as plywood or particle board, is prepared by heating an aqueous sugar or starch solution in the presence of an inorganic acid or its ammonium salt and a metal ion catalyst to obtain a partially polymerized resin which is reacted with an organic acid anhydride just prior to application to the lignocellulosis materials. The adhesive formula contains no formaldehyde and the preferred aqueous solutions are whey or whey byproduct concentrates.

17 Claims, No Drawings

THERMOSETTING ADHESIVE RESINS

RELATED APPLICATION

The present application is a continuation-in-part of our earlier application Ser. No. 557,739 filed Dec. 2, 1983.

TECHNICAL FIELD

The present invention relates to a thermosetting resin adhesive and a method using such adhesive to bind solid lignocellulosic materials to form products, such as plywood or particle board.

BACKGROUND OF PRIOR ART

Urea-formaldehyde and phenol-formaldehyde condensation resins are the major types of thermosetting resins currently used as adhesives for binding together solid lignocellulosic materials, including wood, to form useful products. The resins generally are provided as aqueous solutions containing high solid levels or as powders which may be dissolved in water or applied directly to the lignocellulosic particles prior to hot pressing. Even though most of the formaldehyde reacts with the urea or the phenol and forms part of the polymeric adhesive resin, some free formaldehyde remains and volatilizes from the final product into the immediate environment. Liberation of formaldehyde is also caused by hydrolysis of the resin. Formaldehyde has been implicated as a carcinogen and its presence in the environment poses a potential public health problem. Therefore, it is desirable to have suitable adhesives that do not contain formaldehyde as an ingredient.

The basic raw materials used in condensation resins are derived from petroleum and natural gas. Since the prices of these non-renewable resource materials have increased, attempts have been made to replace them with less expensive carbohydrates. For example, degradation products of sugars and starches have been employed as ingredients in binders for solid lignocellulosic materials to produce water proof plywood and particle boards. The Stofko, U.S. Pat. Nos. 4,107,379; 4,183,997 and 4,357,194 describe the use of such carbohydrates.

The Stofko U.S. Pat. No. 4,107,379 describes the application of a mixture of a sugar solution and an inorganic acid onto the surfaces of the lignocellulosic material to be bonded, followed by heating and pressing until the carbohydrates are transformed into furan-type compounds which act as adhesives.

The Stofko U.S. Pat. No. 4,183,997, which is an extension of the above patent, teaches the further addition of an alkaline agent to prevent an excessive decline in the pH of the resulting adhesive which upon heating can result in hydrolytic degration of wood. The patent states that the sugars may be added directly to the surfaces of the lignocellulosic materials as powders or first mixed with a liquid carrier along with a catalyst to accelerate the transformation of the sugars into water insoluble products and applied as a liquid. When the sugars are added as powders, the process requires melting the mixture and spreading it while it is still hot. This can result not only in the evolution of toxic HCl gas, but also clumping problems unless the lignocellulosic materials being bonded are kept at relatively high temperatures during the application of the hot melt. When a liquid is used as a carrier (water or ethanol) the solution containing the mixture of sugar(s) and catalyst is either applied directly to the materials to be bonded or it is preheated at a temperature from 100° C. to 130° C. for a period from 30 to 120 minutes prior to application.

The Stofko U.S. Pat. No. 4,357,194 describes adhesive compositions which contain, in addition to starches, phenolic containing materials, such as lignin, which are activated by contact with live steam.

The Gibbons et al. U.S. Pat. Nos. 4,085,075 and 4,085,076 describe methods for the manufacture of carbohydrate based thermoset resins. The former patent describes the addition of a carbohydrate and an aminoplast to a phenolformaldehyde novolak resin for making solid molding compositions. The latter patent describes the reaction of an aldose saccharide (preferably a hexose) with a phenolic compound and urea to form a liquid fusible resin. The liquid resin is then mixed with formaldehyde and the pH raised to 8.0 or more prior to the second stage reaction to form a resol resin. Both of the above patents require the presence of formaldehyde in the resin compositions to bind lignocellulosic particles. The formaldehyde is replaced in part by carbohydrate(s), but some formaldehyde is still employed.

BRIEF SUMMARY OF THE INVENTION

It is a primary object of the present invention to disclose a method of binding solid lignocellulosic materials into useful products using an adhesive which does not contain formaldehyde.

The method of the present invention comprises reacting an aqueous sugar or starch solution with an inorganic acid, such as hydrochloric acid, nitric acid or sulfuric acid, or its ammonium salt and a metal ion catalyst at a temperature of about 50° C. to about 200° C. to form a fusible liquid resin. The liquid fusible resin is mixed with a suitable organic acid anhydride, such as phthalic anhydride, prior to application to the surface of the lignocellosic materials to be bonded and the resulting mixture is subjected to heat and pressure to form the desired products e.g., plywood or particle board.

In a preferred embodiment of the invention the aqueous sugar or starch solution is first reacted with a crosslinking agent selected from urea, phenol and mixture of phenol and urea in the presence of the inorganic acid and metal catalyst to form the liquid fusible resin.

It is a further object of the present invention to disclose a novel thermosetting adhesive having improved thermosetting properties.

Another object of the invention is to provide thermosetting adhesive resins which do not contain formaldehyde.

Still another object of the invention is to describe the production of a stable resin that does not support fungal growth.

A further object of the invention is to provide a thermosetting adhesive employing as an essential ingredient inexpensive carbohydrates such as whey, whey permeate and salt whey.

Other objects, features, and advantages will become apparent from the following detailed description of the invention.

DESCRIPTION OF PREFERRED EMBODIMENT

In the preferred practice of the method of the present invention, an aqueous sugar or starch solution, containing about 5% to about 95% sugar or starch by weight of water is reacted with phenol and/or urea and ammonium nitrate in the presence of a suitable metal ion catalyst. The reaction mixture is heated, preferably at about 50° C. to about 200° C. for 30 minutes to 18 hours, to obtain a low viscosity fusible resin liquid having a pH of about 3 to 5. The resin may be further heated to remove water and to obtain the desired viscosity and solids content for application.

Prior to application to the lignocellulosic materials to be bonded, the fusible resin is mixed with a suitable organic acid anhydride, preferably phthalic anhydride or maleic anhydride. The resulting mixture is then applied to the lignocellulosic materials and the resulting mass preferably dried to a moisture content of about 3-12%. It is then heated and pressed at about 160° to about 200° C. for about 5 to about 15 minutes to about 300-1000 psi. The resulting products are strong and do not contain formaldehyde which can escape to the environment.

The exact mechanism of action which occurs during the practice of the method is not known. It is believed, however, that the sugars are converted into reactive monomeric species due to thermal degradation and that the monomers participate in polymerization reactions with the urea or phenol in the presence of the catalyst to the extent that the resultant resin product is either water-soluble or an emulsion of low viscosity that is easily handled with no precipitation of the polymeric resin. Further cross-linking is believed to take place by the reaction of the fusible resin with the acid anhydride in the presence of heat and pressure.

It is believed that addition of the above mentioned cross-linking agents urea and phenol favorably alter the course of the polymerization reactions. This probably is due to the decreased formation of levulinic acid and formic acid and other fission products that may not participate in the polymerization reaction to the same extent as 5-hydroxymethyl-2-furfural (HMF), the principal degradation product of sugars. This redistribution of chemical pathways is especially important in the case of hot acid degradation of aldohexoses (e.g., lactose) where very little HMF is formed in the absence of cross-linkers.

In the method of U.S. Pat. No. 4,183,997, an alkaline agent is added to a pH of 10.5 to counteract the steep decline in pH on heating the sugar(s) and/or starch(es) mixture with a catalyst. We have discovered that the addition of an alkali is not necessary when the crosslinking agent urea is used along with the ammonium salt of an inorganic acid, preferably ammonium nitrate ($NH_4NO_3$). An increase in pH prior to hot pressing also is undesirable because it appears to increase the cure time for urea and/or phenol containing resins. The ammonium nitrate is preferably present in an amount of 5% to 25% by weight of the sugar(s) or starch. The use of $NH_4NO_3$, in addition to controlling the pH, also was found to inhibit fungal growth in the polymeric resin solution and the finished products. It has also been found that use of ammonium nitrate or other ammonium salts, such as ammonium chloride or ammonium sulfate, help to raise the total soluble solids content especially in phenol-containing resins. For example, when ammonium nitrate is used it is possible to increase the solids content up to 65% or more.

The exact nature of the polymerization reactions occurring during the formation of the fusible resins and the final adhesives is not known at the present time. However, speculations can be made. Random copolymerization of HMF and urea to aldimines and formation of melanoidin-like brown nitrogeneous polymers may be occurring. The metallic ions supplied by the metal ion catalyst probably act as catalysts for forming Schiff-base aldimines and related polymers. When phenol is present as a co-reactant some free radical reactions in addition to aromatic substitution may be occurring in the presence of the metal ion catalysts besides reactions involving caramelization of sugar(s). The metal ion might also be catalyzing a reaction between the phenolic moeity in lignocellulosic materials and terminal HMF moeities in the resin.

The fusible resins are soluble in water and DMSO and insoluble in lower alcohols, such as ethanol and methanol, toluene, $CHCl_3$ and ether. Therefore, the fusible resin may be obtained in the form of a powder by adding a liquid in which it is not soluble, such as methanol, to an aqueous solution of the resin to precipitate it. The precipitated resin can be separated by using filtration or centrifugation and dried to obtain a free flowing powder. Another method of obtaining the powdered resin is to add small amounts of ethanol to the aqueous solution, followed by thorough mixing and the addition of methanol. The solid precipitate which forms is separated and dried.

The aqueous sugar or starch solutions may be whey or whey byproducts (including whey permeate and salt whey), sugar solutions containing monosaccharides and disaccharides e.g. mannose, glucose, maltose, lactose, sucrose, or galactose; starches such as amylose, amylopectin, dextrin, molasses or mixtures of sugars and starches. The solutions may contain about 5% to about 95% sugar or starch by weight of the water and have a pH of 0 to 7. The lower limit is applicable when only an inorganic acid, such as hydrochloric acid, nitric acid or sulfuric acid, is used and upper limit when an ammonium salt of an inorganic acid is used. The preferred pH range is about 3 to 7 because at the lower pH's the physical properties of the lignocellulosic materials may be adversely effected.

Whey and whey byproducts are preferred as the carbohydrate source because, in addition to lactose, they also contain residual proteins and fats which act in a beneficial manner to improve the properties of the thermosetting resins when used as adhesives for binding lignocellulosic materials. The proteins probably participate in cross-linking reactions and the small amounts of fats present afford long hydrocarbon chains which probably render the adhesives more water resistance, besides making the resin more evenly spreadable on solid lignocellulosic particles such as sawdust. Excessive amounts of fat should be avoided because they could decrease the effectiveness of the adhesive.

The preferred organic acid anhydrides for use in the present invention are phthalic anhydride, maleic anhydride and ethylene maleic anhydride. Others that can be used include 1, 2, 4, 5-benzenetetracarboxylic anhydride, 1, 2, 3- and 1, 2, 4-benzenetricarboxylic anhydride and other anhydrides of the formula

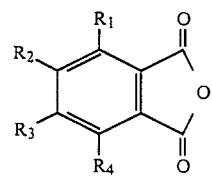

wherein $R_1$, $R_2$, $R_3$ and $R_4$ are hydrogen or alkyl groups of 1 to 18 carbon atoms. The anhydrides in which the substituents are long chain alkyl groups should aid in imparting water resistance to the adhesives. In addition to the above, mixtures of the various anhydrides may also be used. The organic acid anhydride is preferably added in an amount of from about 5% to about 15% weight/volume of the fusible resin (65% solid content).

The organic acid anhydrides are believed to promote further degradation of lactose to HMF, and also to act as condensing agents for cross-linking both reacted and unreacted sugar molecules and other short-chain hydroxyl-containing polymers. In addition when maleic anhydride is employed, a Diels-Alder type reaction can occur with furan moeities in addition to ring opening of the anhydride.

The addition of the organic acid anhydrides not only accelerates the rate of temperature increase in the core of the particle board samples being hot-pressed but also raises the maximum core temperature attained at a given time period compared to samples with no anhydride(s).

The preferred metal ion catalyst is $CuSO_4$. Other catalysts that can be used are the organic and inorganic salts of Zn, Fe, Co, Ni, Al and Cr, as well as other copper salts. Representative of the salts that can be used are the following: $CuCl_2$, $Cu(NO_3)_2$, $CuI_2$, $CuBr_2$, $Fe(NO_3)_3$, $FeCl_3$, $FeSO_4$, $Fe_2(SO_4)_3$, $ZnCl_2$, $ZnSO_4$, $Zn(NO_3)_2$, $CoCl_2$, $NiCl_2$, $NiSO_4$, $CrCl_3$, $Cr_2(SO_4)_3$ and $Al_2(SO_4)_3$. The metal ion catalyst is preferably present in an amount of 0.5% to 5% by weight of sugar(s) or starch.

The practice of the invention is further illustrated by the Examples which follow:

EXAMPLE 1

An 800 ml sample of sweet whey permeate (pH 5.8) containing 6% total solids was concentrated to 75 ml in a laboratory model vacuum concentrator. To this was added 6.65 g. of ammonium nitrate, 9.05 g. of urea and 0.7 g. of anhydrous $CuSO_4$ and the mass was mixed thoroughly. The reaction mixture was then heated in an air tight Parr reactor with vigorous stirring at 110° C., overnight. The reaction product was a reddish-brown fluid of low-viscosity. (At this point, the resin may be heated to remove water from the partially polymerized resin, to any degree desired. Viscosity consideration should be the governing factor in deciding the amount of water to be removed from the partially polymerized resin.)

The thus obtained fusible resin had a solid content of 65%, sp. gravity 1.3 and pH 6.3. To this was added, powdered phthalic anhydride (10% w/v) and dispersed by vigorous stirring. Local pine sawdust was mixed thoroughly with the fusible resin (10% by weight) and dried in an oven at 100° C. for about 10 minutes to remove water. After drying (moisture content 3–10%), a particle mat was formed of the mass and a particle board of ⅜" thickness was formed by heating and pressing the mass between heating platens of a hot press at 180° C. for seven minutes at 800 psi. After cooling to room temperature, an internal bond value of 110 psi was obtained. Boards made under similar conditions using the method of U.S. Pat. No. 4,183,997 had an internal bond strength of 50 psi.

EXAMPLE 2

An 800 ml sample of acid or sweet whey permeate (pH 4.5 or 5.8) was concentrated to 75 ml final volume. This was taken up in an airtight Parr reactor with 7.92 g. of phenol, 0.5 g. of $CuSO_4$ and 6.6 g. of ammonium nitrate and heated at 100° C. for 7 hours. The resultant product was a low-viscosity brown solution. The pH of the resin was about 3.0 and had 68% solids content. Boards made as in Example 1 exhibited an internal bond strength of 80 psi and the percent of swelling in $H_2O$ after 8 hours at 25° was 50. Boards made with the same resin to which phthalic anhydride (10% w/v of resin) had been added as described in Example 1 and pressed and heated under identical conditions were darker but were stronger (130 psi) and more water resistant than the boards of Example 1. (% swelling after 24 hrs. in $H_2O$ at 25° C.=15).

EXAMPLE 3

A 3 liter sample of salt whey (pH 5.2 ) was concentrated to 1300 ml. and 18.75 g. of ammonium nitrate, 21 g. of phenol and 2.25 g. of $CuSO_4$ was added and reacted in a 1 gallon Parr reactor overnight. The product was a light brown emulsion with a solid content of 28%. An aliquot of the sample was heated to remove water and brought to 51% solid level. Particle boards made with local pine saw dust and 10% resin to which phthalic anhydride (10% w/v) had been added as in Example 1 were of comparable strength, but more water resistant as indicated by 10% swelling in $H_2O$ after 24 hrs. at 25° C. and an internal bond strength of 60 psi after immersion in $H_2O$ for 2 hours at 25° C.

EXAMPLE 4

To 40 g. of lactose was added 5 g. of $NH_4NO_3$, 3 g. of resorcinol, 0.7 g. of $CuSO_4$ and 20 ml. of water. This was mixed and charged to an airtight Parr reactor and stirred and heated at 120° C. for 2 hours. The resin obtained was a brown liquid. The resin was mixed with sawdust and phthalic anhydride (10% w/v) and particle boards were made as in Example 1. The boards were lighter in color compared to any other preparations and showed properties similar to boards prepared under Example 2.

The following data was obtained for particle boards of ⅜" thickness made from pine sawdust employing 10% resins levels for phenol containing resins and a pressure of 800 psi and caul temperature of 190° C. The concentration of acid anhydride was kept at 10% w/v of 65% resin sample.

TABLE I

| PB # | Max Core Temp C° | Time of Heating Minutes | Density pcf | Internal Bond Strength psi |
|---|---|---|---|---|
| 1. | 114 | 14 | 53.9 | 50 |
| 2. | 127 | 10 | 59.4 | 52 |
| 3. | 131 | 11 | 50.2 | 82.5 |
| 4. | 134 | 14.5 | 61.8 | 120 |
| 5. | 136 | 9 | 58.9 | 100 |
| 6. | 150 (w PAN)* | 6 | 58.2 | 108 |
| 7. | 155 (w PAN)* | 7 | 59.0 | 132 |
| 8. | 155 (w MAN)* | 7 | 54.6 | 112 |

*PAN is phthalic anhydride and MAN is maleic anhydride.

EXAMPLES 5 AND 6

The procedure of Example 1 was repeated using ammonium chloride and ammonium sulfate in place of the ammonium nitrate. The boards obtained in each instance were of comparable strength to those obtained in Example 1.

EXAMPLE 7

An 800 ml. sample of sweet whey permeate (pH 5.8) containing 6% total solids was concentrated to 75 ml. in a laboratory model vacuum concentrator. To this was added 6.65 g. of ammonium nitrate and 0.7 g of anhydrous $CuSo_4$ and the mass was mixed thoroughly. The reaction mixture was then heated in an airtight Parr reactor with vigorous stirring at 105° C., overnight. The resultant product was a reddish-brown fluid of low-viscosity.

The thus obtained fusible resin had a solid content of 55%, sp. gravity 1–28 and pH 3.3. To this was added, powdered phthalic anhydride (10% w/v) and dispersed by vigorous stirring. Local pine sawdust was mixed thoroughly with the fusible resin (10% by weight) and dried in an oven at 100° C. for about 10 minutes to remove water. After drying (moisture content 5–12%), a particle mat was formed of the mass and a particle board of ⅜" thickness was formed by heating and pressing the mass between heating platens of a hot press at 180° C. for seven minutes at 500–800 psi. After cooling to room temperature, an internal bond value of 130 psi was obtained (% swelling after 24 hours in $H_2O$ at 25° C.=9). The specimen that was immersed in water for 24 hrs. was dried in an oven at 103°+2° C. until approximately constant weight was obtained. The internal bond strength of this dried sample was found to be 88 psi.

The term "phenol" as employed herein is intended to cover not only phenol but also compounds such as substituted phenols, resorcinol, and the like, which will provide the function of phenol in the method and compositions of the present invention.

When a crosslinking agent such as phenol urea or a mixture of urea and phenol is employed it may be present in an amount of about 1% to 100% by weight of the sugar or starch.

It will be apparent to those skilled in the art that a number of modifications and changes may be made without departing from the spirit and scope of the present invention. Therefore, the scope of the invention should not be limited by the foregoing description but only by the claims which follow.

We claim:

1. A method of preparing a thermosetting resin for binding lignocellulosic materials together to form useful products which consisting essentially of heating an aqueous sugar or starch solution and a crosslinking agent selected from urea, phenol and mixtures of urea and phenol in the presence of an inorganic acid or its ammonium salt and a metal ion catalyst at a temperature between about 50° to about 200° C. for about 30 minutes to about 18 hours to obtain a partially polymerized fusible resin and then adding an organic acid anhydride to the fusible resin prior to application to the lignocellulosic materials.

2. The method of claim 1 wherein the aqueous solution is selected from a solution containing a sugar selected from lactose, maltose, glucose, galactose, sucrose and mixtures thereof, a starch selected from amylose, amylopectin, dextrin, molasses and mixtures thereof or mixtures of sugar and starches.

3. The method of claim 1 wherein the acqueous acidic solution is concentrated whey, whey permeate or salt whey.

4. The method of claim 1 wherein the ammonium salt is ammonium nitrate.

5. The method of claim 1 where the metal ion catalyst is selected from inorganic and organic salts of Cu, Zn, Fe, Co, Ni, Al and Cr.

6. The method of claim 1 in which the organic acid anhydride is selected from phthalic anhydride, maleic anhydride, ethylene maleic anhydride or mixtures thereof.

7. The method of claim 1 in which the metal ion catalyst is $CuSO_4$.

8. The method of claim 1 in which the organic acid anhydride is ethylene maleic anhydride.

9. A method of preparing a fusible resin which upon addition of an organic acid anhydride results in thermosetting adhesive useful in binding lignocellulosic materials, said method consisting essentially of heating an acqueous sugar or starch solution and a crosslinking agent selected from urea, phenol and mixtures of urea and phenol in the presence of an inorganic acid or its ammonium salt and a metal ion catalyst at about 50° C. to about 200° C. for about 30 minutes to about 18 hours to obtain an aqueous solution of a partially polymerized fusible resin.

10. The method of claim 9 in which the aqueous acidic solution is whey, whey permeate or salt whey.

11. The method of claim 9 in which the ammonium salt is ammonium nitrate.

12. An aqueous solution of a partially polymerized fusible resin when prepared by the method of claim 9.

13. The method of claim 9 which includes the added step of precipitating the partially polymerized fusible resin from the aqueous solution by adding a liquid in which resin is insoluble, isolating the precipitated resin from the liquid phase and drying the resin to obtain a powder.

14. A resin powder prepared by the method of claim 13.

15. A method of preparing products, such as plywood and particle board, from lignocellulosic materials which comprises treating the lignocellulosic materials with an adhesive prepared by the method of claim 1 and then heating and pressing a mixture of the lignocellulosic material and adhesive at about 160° C. to about 200° C. until the adhesive is cured.

16. A product made by the method of claim 15.

17. A thermosetting adhesive resin prepared by reacting an aqueous sugar or starch solution with an inorganic acid or its ammonium salt in the presence of a metal ion catalyst at a temperature of about 50° to about 200° C. for about 30 minutes to about 18 hours to obtain a partially polymerized fusible resin which is then reacted with an organic acid anhydride.

* * * * *